United States Patent [19]

Kulka

[11] 3,934,552
[45] Jan. 27, 1976

[54] ANIMAL SHELTER WITH PLURAL OPENINGS

[76] Inventor: Helen C. Kulka, 200 Film Bldg., 2108 Payne Ave., Cleveland, Ohio 44114

[22] Filed: July 29, 1974

[21] Appl. No.: 492,674

[52] U.S. Cl. ................................................ 119/19
[51] Int. Cl.² ........................................... A01K 1/02
[58] Field of Search ........................... 119/19, 16, 15

[56] References Cited
UNITED STATES PATENTS

| | | | |
|---|---|---|---|
| 2,775,222 | 12/1956 | Kruck | 119/19 |
| 3,861,356 | 1/1975 | Kulka | 119/19 |

Primary Examiner—Louis G. Mancene
Assistant Examiner—Peter K. Skiff
Attorney, Agent, or Firm—Beall & Jeffery

[57] ABSTRACT

An animal shelter suitable for protecting a pet from loud and/or sudden external noises. The shelter comprises preferably a bag-like housing having at least one entrance and/or exit opening and is constructed of at least one sound absorbing layer and one sound barrier layer of flexible, non-rigid material. The preferred wall structure for the shelter consists of a flexible outer bag member of pliable, weather-resistant vinyl, an intermediate layer of sound and heat insulating material such as a natural or synthetic fibrous product, and an inner layer of fabric or leaded vinyl. The shelter is provided with means for attachment to a rigid base member to facilitate entrance and exit by the animal.

5 Claims, 3 Drawing Figures

ANIMAL SHELTER WITH PLURAL OPENINGS

BACKGROUND OF THE INVENTION

The present invention relates to an animal shelter and more especially to an animal shelter which is suitable for protecting a domestic pet such as a dog from loud and/or sudden external noises such as percussion noises or explosions.

A great many common household pets, and particularly many breeds of dogs, are extremely sensitive to any loud or sudden noises which may occur in the animal's environment. The noises from which the animal shelter according to the present invention is designed to protect a pet may arise from any number of sources, and this number is constantly growing in our modern technologically oriented society wherein the problem of noise pollution becomes ever more serious each year. For example, noises which arise from outside the home include noises from vehicular traffic, construction work and the like, whereas noises arising within the home may range from any of today's noise-generating appliances to the slamming of doors and even to noisy children. Other special circumstances can also be envisioned where the animal shelter according to the present invention would find utility such as, for example, a hunting or other environment wherein the sound of gunfire must be tolerated, or the especially sensitive profession where highly bred dogs are shown and otherwise placed in competition.

Pet shelters constructed in the form of a covered dog bed have been proposed in the past, but these designs have had a number of disadvantageous features. For example, U.S. Pat. No. 1,879,473 discloses a thin, flexible blanket which is attached to a rigid base having a single door frame. The shelter does not provide complete protection of the pet from external noises and cold, and it requires that the pet turn around once inside the shelter in order to find his way out. U.S. Pat. No. 2,775,222 discloses a dog bed which has a blanket comprising two sheets of flexible material with insulating material therebetween attached to a pillow and a spring-closable opening for entrance and exit. The disadvantages of this dog bed are readily apparent. The opening defined by the spring is very limited in size, thereby making it very difficult for the dog to enter and leave the shelter. In addition, the bed in use would be difficult to manage due to the tendency of the bed to move when the dog is trying to enter the same. The bed of this patent has no base member as such, other than the pillow which is of the same external dimensions as the blanket. A number of improvements in the dog beds shown in the art have been proposed by applicant in her U.S. patent application Ser. No. 339,372. The subject of the present invention comprises even further useful and novel improvements in pet shelters of the same general kind shown in the aforementioned U.S. application.

SUMMARY OF THE INVENTION

It is therefore an object of the present invention to provide an animal shelter which can be used to suitably house a variety of domestic pets and at the same time provide protection for these pets from loud and/or startling noises which occur in the pet's environment.

Another object of the present invention resides in providing an animal shelter which is of extremely simple construction and is formed of lightweight materials.

It is yet another object of the present invention to provide an animal shelter, particularly for dogs, wherein the shelter can be employed either as a stationary fixture or an easily portable device.

A further object of the present invention is to provide an animal shelter in which an untrained pet can enter into and exit from with a minimum of effort.

Still another object of the present invention is to provide an animal shelter which combines the effects of both sound and heat insulation.

In accomplishing the foregoing objects, there has been provided according to the present invention an animal shelter suitable for protecting the occupant from loud and/or sudden external noises which comprises a housing member having an integral outside surface layer, and contiguous to this outside surface layer, at least one sound absorbing layer and at least one sound barrier layer. The housing member is preferably formed of a flexible, non-rigid material and in the form of a bag or pouch having at least an entrance and/or exit opening. Outside the housing, provision is made for removable attachment to a solid base member of rubber or the like. The housing member preferably has a heat insulating substance in addition to the sound barrier and sound absorbing material.

Other objects, features and advantages of the present invention will become apparent from the detailed description of the invention which follows when taken together with the application drawings.

BRIEF DESCRIPTION OF THE APPLICATION DRAWINGS

DETAILED DESCRIPTION OF THE INVENTION

Figure 1:
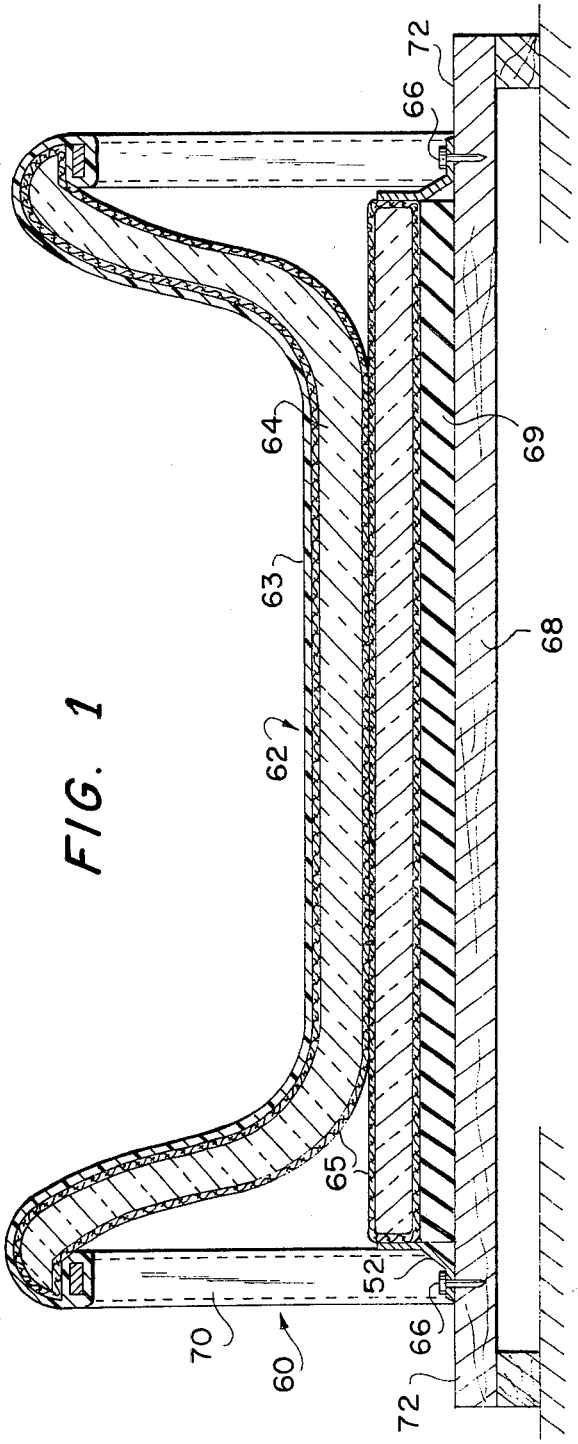
FIG. 1 is a vertical longitudinal sectional view of the animal shelter according to the present invention illustrating a preferred construction of the structure.

Referring now to the drawings, wherein like numbered parts are referred to by like numerals, in FIG. 1 is illustrated an animal shelter in accordance with the present invention designated generally by reference numeral 60. The preferred shelter consists of flexible, bag-shaped housing 62 resting upon and secured to a base member 68. The bag member is itself formed from a pliable, weather-resistant layer 63 of vinyl material as its outside layer, an intermediate layer 64 of sound and heat insulating material such as a natural or synthetic fibrous product, e.g., dacron, wool, etc., and an inside layer 65 of fabric, leaded vinyl or the like which serves both to confine the intermediate layer 64 and also to act as a sound barrier layer. Bag 62 is secured at its extremities, by means of nails 66, to base member 68 which is constructed preferably of wood. To permit entrance of a pet, the open ends of bag 62 are held permanently open by means of upstanding frames 70 which are also secured to base 68. An extending portion 72 of base 68 is provided in front of the bag opening for the purpose of stabilizing the entire bag when a pet is in the process of entering or leaving the shelter. An intermediate layer 69 of cushioning and/or insulating material may also be provided between base 68 and the bottom wall of bag 62.

Figure 3:
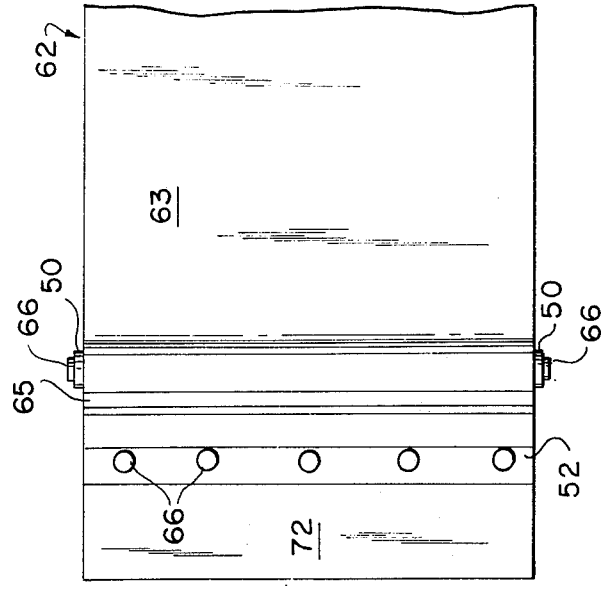
FIG. 3 is top view of the exit opening embodiment of FIG. 2.
Figure 2:
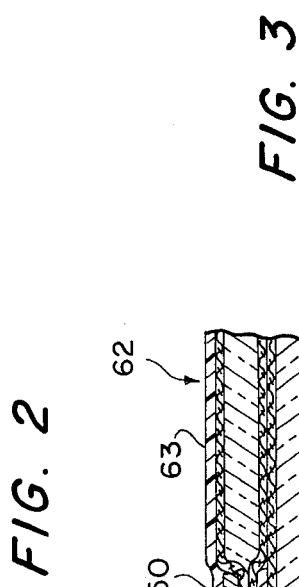
FIG. 2 is a vertical longitudinal sectional view illustrating an alternative embodiment having an elasticized exit opening.

In FIGS. 2 and 3 is illustrated another possible configuration for one of the openings. One open end of bag member 62 is provided with an elastic member 50 which extends across the width of the pet shelter, and around it is folded the outside layer 63 of the bag member. If desired, the inside layer 65 may extend under the elastic member as shown in FIG. 2 and the layers of elastic and fabric may be sewn or cemented to hold them securely together. FIG. 3 illustrates a top view of the embodiment of FIG. 2. Elastic members 50 extends beyond the edges of bag member 62 and on each side of the shelter is folded downwardly and fastened by a nail 66 to the edge of base 68. Thus, the opening is biased in the closed position by elastic member 50, but is easily opened by lifting the top layered assembling of the bag member to stretch the elastic member. It is intended that when the elasticized opening of FIGS. 2 and 3 is provided at one end of the pet shelter, a second opening as shown in FIG. 1 is provided at the opposite end. In operation, the pet enters through the opening which is supported in open position by frame member 70 and exits through the elasticized opening by nosing its way out under the elastic member. Whether the shelter is provided with two openings held in a permanently open position, as shown in FIG. 1, or whether one opening is permanently open and the other is biased in a generally closed position, it will be seen that in no case must the pet turn around inside the shelter in order to exit easily. Therefore, the shelter can be constructed relatively narrow in width.

While the present invention has been described with reference to preferred embodiments thereof, it is apparent that other embodiments utilizing the inventive concepts of the present invention will be readily perceivable by those of ordinary skill in the art. For example, additional layers of sound insulating material might be employed in constructing the bag member or a freely swingable door might be provided at one or both of the openings supported by frame member 70 so as to further isolate the pet from external noises. Accordingly, it is to be understood that the concepts of the present invention are not to be limited except by the following claims.

I claim:

1. An animal shelter suitable for protecting the occupant from loud and/or sudden external noises, comprising a housing member having a solid integral outside surface layer, and contiguous thereto at least one sound absorbing layer and at least one sound barrier layer, said housing member comprising a non-rigid bag-like member having more than one opening and being rigidly attached to a base member a portion of which extends laterally from said housing member to form a threshold entrance area to said housing, and rigidifying means associated with said housing member in the region of at least one of said openings for maintaining such housing member permanently open for entrance to and exit from said shelter, said rigidifying means comprising a rigid frame attached to said base member and extending vertically therefrom for supporting the open end of said bag-like member and holding said member open, said rigid frame defining an opening aligned with said opening in said housing member, said opening in said frame being sufficiently large to permit substantially unrestricted movement of said animal to and from said shelter.

2. An animal shelter according to claim 1, wherein said sound absorbing layer comprises a heat insulating material.

3. An animal shelter according to claim 1, wherein one of said openings in said housing member has resilient biasing means for biasing said opening into closed position.

4. An animal shelter according to claim 3, wherein said resilient biasing means comprises an elastic member.

5. An animal shelter according to claim 1 wherein there are two openings in said bag-like member, one at each end of the shelter, said openings being aligned with openings defined by a rigid frame at each said end, said forms being rigidly attached to base.

* * * * *